C. E. GANE.
MILKING MACHINE.
APPLICATION FILED JUNE 8, 1910.

1,016,004.

Patented Jan. 30, 1912.

2 SHEETS—SHEET 1.

WITNESSES:
W. H. Berrigan
John V. Hoving

INVENTOR,
CYRIL EDMUND GANE,
by Ivan Iedennel
Attorney.

C. E. GANE.
MILKING MACHINE.
APPLICATION FILED JUNE 8, 1910.
1,016,004.
Patented Jan. 30, 1912.
2 SHEETS—SHEET 2.
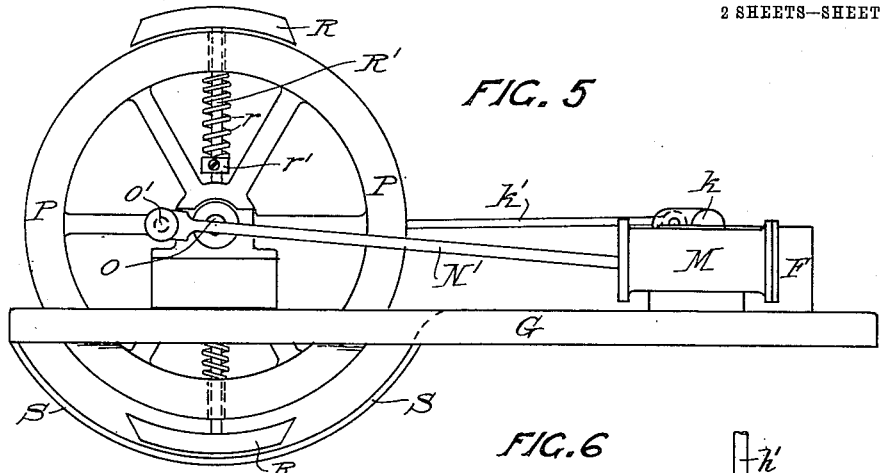
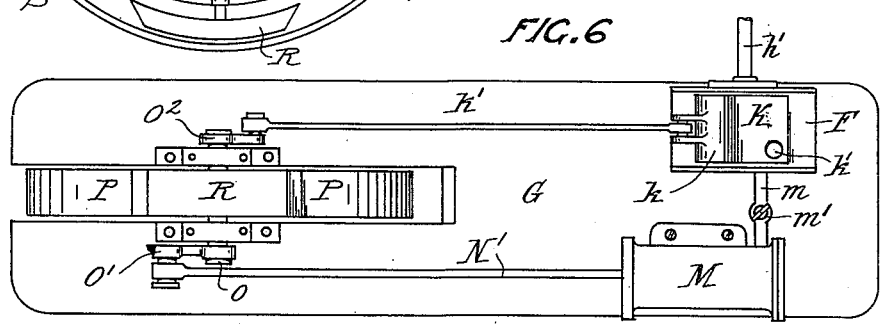
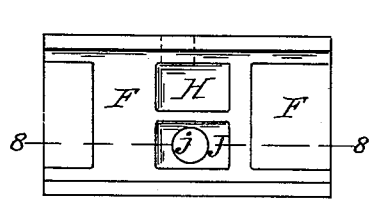
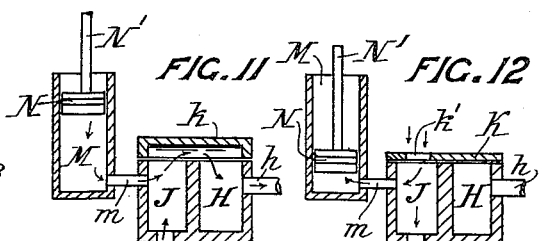
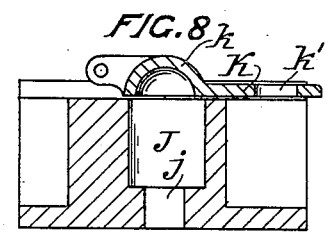 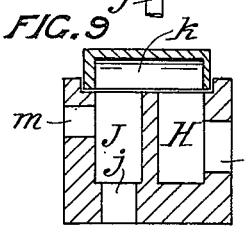 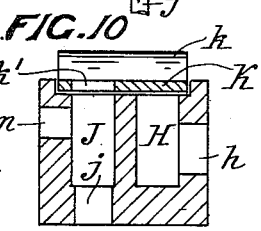
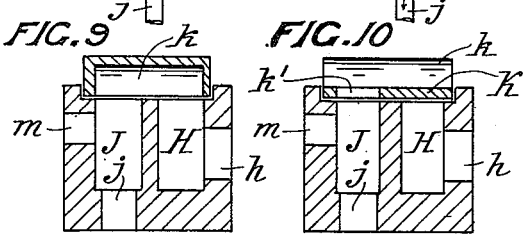
WITNESSES:
INVENTOR,
CYRIL EDMUND GANE,
by H van Oldenneel
Attorney.

UNITED STATES PATENT OFFICE.

CYRIL EDMUND GANE, OF NORMANBY, NEW ZEALAND.

MILKING-MACHINE.

1,016,004.  Specification of Letters Patent.  Patented Jan. 30, 1912.

Application filed June 8, 1910. Serial No. 565,847.

*To all whom it may concern:*

Be it known that I, CYRIL EDMUND GANE, subject of the King of Great Britain, residing at Normanby, Taranaki, in the Dominion of New Zealand, have invented a new and useful Improvement in Milking-Machines; and I do hereby declare the following to be a full, clear, and exact description of the same.

This invention relates to that class of machine for milking cows in which teat cups are arranged in sets to fit upon the cow's teats, and are each constructed with an outer rigid casing and an inner inflatable lining the space surrounding which lining is caused, during the milking operations, to be alternately connected with different degrees of pneumatic pressure by connection with a pulsator, while the space inclosed by the lining is connected with a source of vacuum suction.

The invention has been designed to provide (1) an improved construction of teat cup by means of which the alternate pressure and release of the lining upon the teat inserted within it caused by connecting the space around it alternately to the different degrees of pneumatic pressure, may be imparted first to the upper end of the teat, and then to the lower end thereof, in order thus to work the milk down the teat; (2) improved means whereby this pulsating effect may be obtained, and (3) improved means whereby the vacuum suction upon the inside of the teat cups may be broken so as to allow of the cups dropping off the teats when the milking is finished.

In fully describing the invention, reference will be made to the accompanying sheets of the drawings, in which:—

Figure 1:
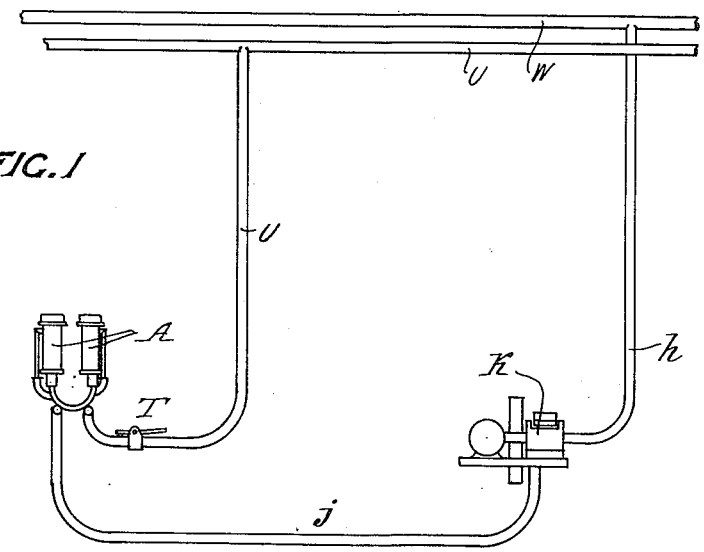
Figure 2:
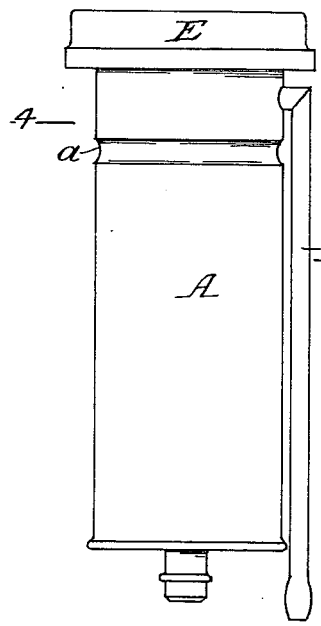
Figure 3:
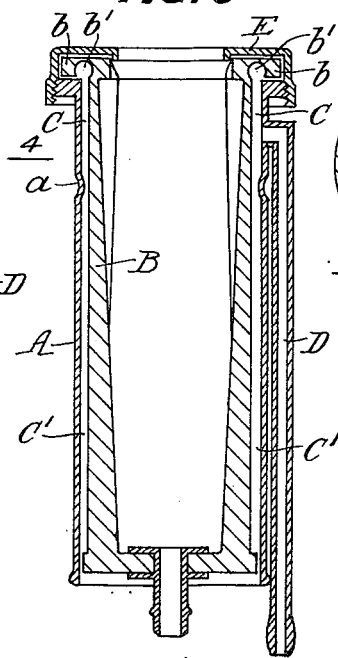
Figure 4:
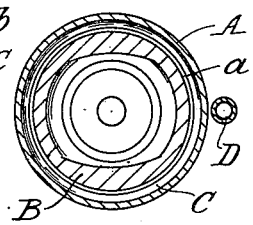
Figure 13:
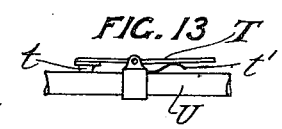
Figure 14:
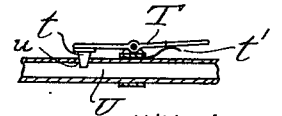

Figure 1 is a view showing the arrangement of the parts constituting this invention. Fig. 2 is an elevation of the improved teat cup. Fig. 3 is a sectional elevation thereof. Fig. 4 is a cross sectional plan taken on the line 4—4 of Fig. 2. Fig. 5 is a side elevation of the pulsator. Fig. 6 is a plan thereof. Figs. 7 to 10 are detail views of parts of the pulsator that will be hereinafter more fully described. Figs. 11 and 12 are diagrams illustrating the principle upon which the pulsator works. Figs. 13 and 14 are respectively side elevation and section of the means employed for breaking the vacuum suction within the teat cups.

In carrying out the invention, the teat cup casing A is formed with an inwardly projecting ledge $a$ around its peripheral face, near the upper end thereof. This ledge is made of such a size that it extends across between the casing A and the surface of the usual inflatable lining B, as shown in Figs. 3 and 4, and therefore serves to divide the annular space between the lining and the casing into an upper compartment C and a lower compartment C'. These two compartments are adapted to be joined into one as the lining moves inward by the admission of air pressure to the space around it.

The connection D for conveying the pulsations to the lining is arranged to enter the upper compartment C so that, when the lining is being inflated, the air pressure will first act upon the upper portion of the lining, and as such is pushed inward away from contact with the ledge $a$, will pass down into the lower compartment C' and act upon the lower portion of the lining. In like manner, as the lining is being deflated by withdrawing the air from the space around it, the upper end of the lining will first be acted on so as to draw it out and release the teat from the pressure first at its upper end. Thus the pulsations of the teat cup will provide for the teat in it being squeezed first at its top end and then for the squeeze extending down its length, and afterward, for the teat being released from the squeeze in the same order. The teat will thus be submitted to the squeezing necessary to express the milk from it. To provide for this action of the lining B being exerted upon the teat close up to its roots, the lining is made with a flange $b$ on its top end that extends outward over the top edge of the casing A. The underside of this flange is hollowed out as at $b'$ so that the lining will be weakened right up through its height and thereby act upon the teat in the manner required. The lining is held in position by means of the metallic cap E screwed down over the casing and jamming the flange $b$ between it and the casing top. The lower end of the casing is left open so that the lining may stretch or contract lengthwise without affecting the teat cup.

The pulsator shown in Figs. 5 to 12 is adapted to work automatically by merely connecting it with the vacuum or suction pump, and to alternately make communication between the teat cup and the vacuum and between the teat cup and the atmosphere. The pulsator consists of a metal block F that is secured upon a base plate G and the details of the construction of which are shown in Figs. 7 to 10. Fig. 7 being a plan, Fig. 8 a longitudinal section on the line 8—8 of Fig. 7, and Figs. 9 and 10 cross sections. This block is formed with a pair of chambers H and J, open at their top ends and a plate K is fitted to slide to and fro along the top of the block. This plate is formed with an upwardly curved portion $k$ at one end which is adapted to form a connecting passage between the two chambers H and J (as shown in Fig. 9) when the plate is moved to one end of its movement. The flat portion of the plate is adapted to overlie these chambers when the plate is at the other limit of its movement and thus cut them off from one another (as shown in Fig. 10) but it is formed with an aperture $k'$ therein which aperture overlies the chamber J. The chamber H is connected with the source of vacuum through the pipe $h$ while the chamber J is connected with the teat cups through the pipe $j$. Thus when the plate K is in the position shown in Figs. 8 and 9 the teat cup is connected with vacuum through the pipe $j$, chamber J, passage $k$, chamber H and pipe $h$. When the plate is moved to the position shown in Fig. 10, the vacuum is cut off from the teat cup and air is admitted thereto through the aperture $k'$ chamber J and pipe $j$. The reciprocal sliding movements of this plate K will thus serve to impart the required pulsations to the teat cup lining. To cause these movements to be automatically imparted to the plate K, a cylinder M is provided and mounted on the base plate G. This cylinder is connected at its back end with the chamber J by means of the connection $m$, and this connection is governed by the valve $m'$ (Fig. 6). A piston N (Figs. 11 and 12) fits in the cylinder and a piston rod N' extends out the front end thereof and is connected with a crank O' upon one end of a crank shaft O that is supported in bearings upon the base plate. Another crank $O^2$ is fixed to the other end of this crank shaft and this crank is connected by means of the connecting rod K', with the slide plate K. Thus the rotation of the crank shaft will cause reciprocal movements to be imparted to the slide plate K and piston N. The piston crank and slide plate crank are so arranged relatively to each other that when the piston is at the outer limit of its movement, the slide plate will be pushed back to the position shown in Figs. 8, 9, and 11, i.e. to the position necessary to connect the chamber J with the vacuum. Thus the back end of the cylinder will also be placed in communication with the vacuum and the suction thereof will draw the piston back to the back end of the cylinder and thereby cause the crank shaft to be turned to draw the slide plate K forward to the position shown in Figs. 10 and 12. This will cause the atmosphere to be admitted to the chamber J and through it to the back end of the cylinder so that the pressure thereof will allow the piston to be pushed to the front end of the cylinder again and to thus force the slide plate K back.

To provide for the crank shaft turning freely and for the reciprocal movements of the piston and the slide plate being thereby carried out continuously by the connection of the cylinder alternately with air and vacuum, a fly wheel P is mounted on the crank shaft. This fly wheel carries a pair of brake blocks R upon the outer face of its periphery, one being arranged diametrically opposite the other. Each of these blocks is attached to a rod R' that extends radially in through the rim of the wheel. A spring $r$ surrounds the inner end of this rod and its ends bear respectively against an adjustable collar $r'$ and the wheel rim. The tension of the spring may thus be regulated by altering the position of the collar. The springs $r$ thus serve to keep the respective brake blocks from being thrown out by the centrifugal action of the wheel as it revolves, but they are made of such a strength as to permit of each brake block dropping on to and sliding over a concentrically arranged plate S as it travels around through the lower half of its revolution. This engagement of the brake blocks with the curved plate S will serve to check the wheel in its rotation and thereby prevent the slide plate K from moving too quickly. The amount of braking action of these blocks may be regulated by altering the tension of their springs $r$.

The means devised for breaking down the vacuum suction of the teat cups upon the teats and thus permit of the cups falling freely from the teats are shown in Figs. 13 and 14. These means consists in a lever arm T that is pivotally mounted on a suitable portion of the vacuum tube U leading to the insides of the teat cups. One end of this lever is provided with a cone shaped plug $t$ that fits into an aperture $u$ formed in the vacuum tube and is adapted to seal such aperture. This cone plug is caused to keep the aperture normally closed by means of the spring $t'$ bearing on the opposite end of the lever. By depressing this latter end the plug may be raised more or less from the aperture so that air may enter and break down the vacuum in the tube.

In the general view shown in Fig. 1 the parts forming this invention are shown in their assembled position, and in such view the teat cups are shown as arranged upon an ordinary claw in a set of four. In this figure A represents the teat cups which are connected in the usual manner with the main milk vacuum pipe U and with the pulsator K, by the pipe $j$, which pulsator is in turn connected with a main vacuum pipe W through the pipe $h$.

Although the apparatus herein set out has been described as operated by means of vacuum suction and ordinary atmospheric air pressure, it will be readily understood that it will act in the same manner with any two different degrees of air pressure, for instance instead of the atmospheric air, compressed air may be substituted.

What I do claim as my invention, and desire to secure by Letters Patent is:—

1. A pulsator comprising, a block provided with a vacuum chamber and a teat-cup chamber; a sliding plate adapted to reciprocate on the block and formed with an upwardly curved portion at one end adapted to form a passage between the two chambers at one position of the sliding plate, the flat portion of the sliding plate being adapted to over-lie the chambers at another position thereof and provided with an aperture communicating with the cup chamber in said last named position; pipes for connecting said chambers with the vacuum and teat-cups respectively; means for automatically reciprocating the sliding plate comprising a cylinder connected at its back end with the teat-cup chamber; a valve controlling said connection; a piston in said cylinder; a crank-shaft; a pair of cranks thereon; a rod connecting one crank to the piston; a rod connecting the other crank to the sliding plate, the angle between said cranks being such that when the piston is in outermost position, the plate is in position to connect the chambers; and a governor wheel on said shaft.

2. In a milking machine, the combination of a rigid casing formed with an inwardly projecting ledge around its peripheral face near the upper end thereof; an inflatable lining in said casing, said ledge extending across between the casing and the surface of the lining and thus dividing the space between the lining into an upper and a lower compartment, an opening being provided in the upper compartment; a flange at the upper part of the lining and having a weakened hollowed-out place; a metallic cap screwed over the casing and jamming the lining against the top of the casing; a block provided with a vacuum chamber and a teat-cup chamber; a sliding plate adapted to reciprocate on the block and formed with an upwardly curved portion at one end adapted to form a passage between the two chambers at one position of the sliding plate, the flat portion of the sliding plate being adapted to over-lie the chambers at another position thereof and provided with an aperture communicating with the cup chamber in said last named position; pipes for connecting said chambers with the vacuum and teat-cups respectively; means for automatically reciprocating the sliding plate comprising a cylinder connected at its back end with the teat-cup chamber; a valve controlling said connection; a piston in said cylinder; a crank-shaft; a pair of cranks thereon; a rod connecting one crank to the piston; a rod connecting the other crank to the sliding plate, the angle between said cranks being such that when the piston is in outermost position, the plate is in position to connect the chambers; and a governor wheel on said shaft.

In testimony whereof, I have signed this specification in the presence of two subscribing witnesses.

CYRIL EDMUND GANE.

Witnesses:
 JOHN ELAIR,
 TRUBY KING.